(12) United States Patent
Kruepl-Sypien (10) Patent No.: US 11,379,890 B2
(45) Date of Patent: Jul. 5, 2022

(54) CONVERSATIONAL MAPPING OF WEB ITEMS FOR MEDIATED GROUP DECISIONS

(71) Applicant: Bernhard Kruepl-Sypien, Vienna (AT)

(72) Inventor: Bernhard Kruepl-Sypien, Vienna (AT)

( * ) Notice: Subject to any disclaimer, the term of this patent is extended or adjusted under 35 U.S.C. 154(b) by 392 days.

(21) Appl. No.: 16/379,561

(22) Filed: Apr. 9, 2019

(65) Prior Publication Data

US 2019/0311410 A1 Oct. 10, 2019

Related U.S. Application Data

(60) Provisional application No. 62/655,482, filed on Apr. 10, 2018.

(51) Int. Cl.
*G06Q 30/02* (2012.01)
*G06F 16/955* (2019.01)
(Continued)

(52) U.S. Cl.
CPC ..... *G06Q 30/0282* (2013.01); *G06F 3/04817* (2013.01); *G06F 16/9536* (2019.01); *G06F 16/9558* (2019.01); *G06Q 30/0625* (2013.01); *H04L 51/04* (2013.01)

(58) Field of Classification Search
CPC ............. G06F 3/04817; G06F 16/9536; G06F 16/9538; G06Q 30/0282; G06Q 30/0625; H04L 51/04
See application file for complete search history.

(56) References Cited

U.S. PATENT DOCUMENTS

2005/0210025 A1* 9/2005 Dalton ................ G06F 16/9535
2009/0270048 A1* 10/2009 Wolff .................... H04L 65/403
455/90.2

(Continued)

FOREIGN PATENT DOCUMENTS

EP 1170690 A1 1/2002

OTHER PUBLICATIONS

Patent Cooperation Treaty~International Searching Authority; Written Opinion of the International Searching Authority (PCT Rule 43bis 1) for International Application No. PCT/IB2019/000511; dated Sep. 20, 2019; 7 pages.

*Primary Examiner* — Eric J. Bycer (57) ABSTRACT

A method and apparatus for conversational mapping of web items for mediated group decisions is disclosed. In one embodiment of the method, a web server delivers a web page that comprises a hyperlink and identities of one or more products that were selected at an E-commerce website by an online shopper via a web browser. In response to activation of the hyperlink by the online shopper via the web browser, product information for the one or more products is transferred in a transaction message to a decision-support system via a network. The decision-support system sends some or all of the product information to one or more user devices. The decision-support system subsequently receives review information related to the one or more products from the one or more user devices via a messaging service. The decision-support system processes the product review information to generate a result, and the decision-support system sends the result to another user device for display thereon via the messaging service.

20 Claims, 9 Drawing Sheets

(51) Int. Cl.
*H04L 51/04* (2022.01)
*G06Q 30/06* (2012.01)
*G06F 16/9536* (2019.01)
*G06F 3/04817* (2022.01)

(56) References Cited

U.S. PATENT DOCUMENTS

| | | |
|---|---|---|
| 2010/0174623 A1 | 7/2010 | Mcphie et al. |
| 2011/0320373 A1* | 12/2011 | Lee ......................... H04L 67/14 |
| | | 705/319 |
| 2012/0158516 A1* | 6/2012 | Wooten, III ....... G06Q 30/0269 |
| | | 705/14.66 |
| 2014/0019567 A1* | 1/2014 | Chen ...................... H04L 51/34 |
| | | 709/206 |
| 2014/0195931 A1* | 7/2014 | Kwon .................... G06Q 30/02 |
| | | 715/753 |
| 2015/0058154 A1 | 2/2015 | Appleyard et al. |
| 2015/0278917 A1* | 10/2015 | Stoll ...................... G06Q 50/01 |
| | | 705/26.7 |
| 2016/0034514 A1* | 2/2016 | Singhal ............... G06F 16/9535 |
| | | 707/706 |
| 2016/0110789 A1* | 4/2016 | Gilb .................. G06Q 30/0619 |
| | | 705/26.44 |
| 2016/0117758 A1 | 4/2016 | Bleakley et al. |
| 2017/0317962 A1* | 11/2017 | Chen ....................... H04L 67/36 |
| 2017/0364866 A1* | 12/2017 | Steplyk ................ G06Q 10/101 |
| 2018/0048594 A1 | 2/2018 | De Silva et al. |
| 2018/0089570 A1* | 3/2018 | Kenthapadi ............ G06N 5/022 |
| 2018/0152407 A1* | 5/2018 | Soni ........................ H04L 51/34 |
| 2019/0065033 A1* | 2/2019 | Kulkarni ............. G06F 3/04842 |

* cited by examiner

A – Product I
B – Product II
C – Product III
810

A – Product I
821

B – Product II
822

C – Product III
823

824

820

What is you preferred order?

C A B

830

C – Product III    841
B – Product II     842
A – Product I      843

840

1. Product III
2. Product I
3. Product II
850

CAB

ACB

CBA

Algorithm 940

Dowdall system
(a decimalised modification of a preferential Borda count)
1/pos decimal votes for each ranked candidate
0 decimal votes for unranked candidates

920

| 1. | C | 1/1 | 1.0 |
| 2. | A | 1/2 | 0.5 |
| 3. | B | 1/3 | 0.33 |

| 1. | A | 1/1 | 1.0 |
| 2. | C | 1/2 | 0.5 |
| 3. | B | 1/3 | 0.33 |

| 1. | C | 1/1 | 1.0 |
| 2. | B | 1/2 | 0.5 |
| 3. | A | 1/3 | 0.33 |

930

| 1. | C | 1/1 + 1/2 + 1/1 | 2.5 |
| 2. | A | 1/2 + 1/1 + 1/3 | 1.88 |
| 3. | B | 1/3 + 1/3 + 1/2 | 1.17 |

CONVERSATIONAL MAPPING OF WEB ITEMS FOR MEDIATED GROUP DECISIONS

CROSS-REFERENCE TO RELATED APPLICATION

This application claims the domestic benefit under Title 35 of the United States Code § 119(e) of U.S. Provisional Patent Application Ser. No. 62/655,482, entitled "Conversational Mapping of Web Items for Mediated Group Decisions," filed Apr. 10, 2018, naming Bernhard Kruepl-Sypien as an inventor, and which is hereby incorporated by reference in its entirety and for all purposes as if completely and fully set forth herein.

BACKGROUND OF THE INVENTION

Electronic commerce (E-commerce) is the activity of buying or selling of products or services over the Internet. E-commerce websites enable online users (hereinafter "shoppers") to select items for purchase through use of a web browser. Shoppers access web pages that list products of interest using browser software executing on devices such as desktop computers, laptop computers, smart phones, etc. The web pages provide product information including descriptions, specifications, images, prices, etc., to online shoppers. To aid shoppers in making purchasing decisions, web pages may also include product reviews posted by others who have purportedly purchased the products of interest. These reviews are often accompanied by a numerical rating (e.g., 4 stars out of 5).

Although many product reviews and ratings are legitimate, many are not. More and more nefarious companies are posting reviews and ratings for compensation from product manufacturers in order to inflate their product's standing at E-commerce websites. The compensated review process is simple: the companies in question are paid to create fake accounts, purchase products from E-commerce websites, and write 4 or 5 star reviews for those products. Further, these companies are paid to write negative reviews and low ratings for competitor products. This violates E-commerce website terms of use. But the companies that submit false reviews and ratings are difficult to police because the reviews and ratings are based on verified purchases. While E-commerce websites try to shut down companies that sell fraudulent reviews and ratings, by the time these companies are caught, their manufacturing clients have made a substantial number of sales. Moreover the fraudulent reviewers will likely pop up again under new names to repeat the process.

Shoppers are increasingly aware of this growing problem, and as a result they avoid reviews and ratings posted at E-commerce websites when making purchasing decisions, even though many of the reviews and ratings are legitimate and useful. As a result, shoppers are forced to make online purchasing decisions by themselves and based only on product information provided at E-commerce websites.

SUMMARY

The present disclosure provides a method and apparatus for transferring content received via a web channel to one or more user devices (e.g., desktop computers, laptop computers, tablets, smart phones, etc.) via a messaging channel. For example, the present disclosure provides a method and apparatus for transferring product information from an E-commerce website to one or more user devices via a messaging channel that includes a messaging service. The remaining disclosure will describe a method and apparatus for transferring product information from an E-commerce website to multiple user devices via a messaging service, it being understood the present disclosure should not be limited thereto.

In one embodiment, a hyperlink button is embedded at an E-commerce website and is linked to one or more products selected by a shopper via a web browser. The hyperlink button can be embedded in an online shopping cart that contains the one or more items added by the shopper. The present disclosure will be described with reference to a hyperlink button embedded within a shopping cart, it being understood the present disclosure should not be limited thereto.

When the button is activated by the shopper, an HTTP request is invoked to transfer product information for the shopping cart item(s) to a decision-support system via a network (e.g., the Internet). The present disclosure will be described with reference to transferring product information for shopping cart item(s) to the decision-support system via the Internet, it being understood the present disclosure should not be limited thereto. Indeed, the Web server that presents the shopping cart with embedded hyperlink and the decision-support system, may both be owned by the same business entity and in data communication with each other via a local area network. The term "product information," which includes descriptions, specifications, images, hyperlinks to product information, etc., will be used interchangeably with the term "shopping cart item(s)."

The decision-support system receives and locally stores the shopping cart item(s) in a data object. The decision-support system creates a shopping cart (SC) reference and maps it to the stored shopping cart item(s). The decision-support system subsequently sends the SC reference and a redirect command to the shopper's user device (e.g., smart phone). The redirect command prompts the shopper's user device to open a messaging application, which in turn starts an electronic conversation (e.g., an exchange of electronic messages via the messaging service) between the shopper and the decision-support system. The decision-support system may include a chatbot that mediates the conversation between the decision-support system and the shopper. Thus, in one embodiment, the redirect command opens an electronic conversation with the mediating chatbot.

The decision-support system may receive the SC reference from the shopper via the messaging service. The decision-support system can access its local memory and retrieve the shopping cart item(s) mapped to SC reference. The decision-support system may then send the shopping cart item(s) to the shopper through the messaging service for subsequent display on the shopper's user device. In one embodiment, shopper interaction with the decision-support system enables display of the selected shopping cart item(s) in a text list, a list template, a carrousel template, a widget, etc. In another embodiment, the selected shopping cart item(s) are described to the shopper by the means of a computer generated voice.

The shopper can share the shopping cart item(s) with individuals or entities for the purpose of obtaining their reviews or recommendations. A review may include a product rating, product rankings, or other input. To that end, the shopper can select trusted individuals. The selected individuals will be referred to herein as the "reviewers." The shopper can share the shopping cart item(s) with the reviewers by sending a review request message to a messaging service. The message may include the SC reference and contact information for the selected reviewers.

The messaging service receives the review request message. Using contact information in the message, the messaging service can send invitations to set up respective conversations between the decision-support system and the reviewers via their user devices (e.g., smart phones) and the messaging service. The chatbot mentioned above can mediate an exchange of electronic messages between the decision-support system and the reviewers in one embodiment. In another embodiment, the decision-support system can set up a group chat with the reviewers. In a variant, the chatbot only reacts to messages in the group messaging chat when addressed by its name. Once the group chat or conversations are set up, the decision-support system sends the shopping cart item(s) to the reviewers via the messaging service.

The reviewers can review the shopping the cart item(s) displayed on their user devices. For example, the reviewers can numerically rate (e.g., three stars out of five) a shopping cart item, or the reviewers can rank shopping cart items. With respect to the latter, a reviewer may rank items by listing them according to the reviewer's preferred order. Or the decision-support system generates and sends a character reference such as A, B, C, . . . for each shopping cart item, and a reviewer can provide a ranking by sending a message which contains an order such as "C B A" to indicate the reviewer's preference. When finished the reviewers can send their reviews to the decision-support system using the messaging application on their devices. The decision-support system receives the ranking or rating via respective messaging channels.

The decision-support system receives messages that contain the reviews for the shopping cart item(s). The decision-support system processes the reviews to generate a result. For example, the decision-support system calculates an average rating for a shopping cart item based upon the ratings provided by the reviewers. Or the decision-support system calculates an aggregate ranking of shopping cart items based upon ranking lists provided by the reviewers. Ultimately, the decision-support system sends the result of the processing to the shopper's user device for display thereon via the messaging service.

The Figures depict various embodiments of the present disclosure for purposes of illustration only. One skilled in the art will readily recognize from the following discussion that alternative embodiments of the structures and methods illustrated herein may be employed without departing from the principles of the invention described herein.

DETAILED DESCRIPTION

A method and apparatus is disclosed that enables an online shopper decision-support process. The method and apparatus, in one embodiment, links web channels with messaging channels. While the present disclosure will be described with reference to linking web channels to messaging channels, the present disclosure should not be limited thereto. Indeed, the present disclosure contemplates linking web channels with other electronic dialogue channels such as email channels.

The present disclosure provides a decision-support system, which enables data communication between an E-commerce website and a messaging service, which in turn enables an online decision-support process. The online decision-support process is conducted in a structured manner through a messaging channel that includes the messaging service. The decision-support system enables a group of one or more trusted reviewers to provide reviews or recommendations of items selected by a shopper at an E-commerce website. The decision-support system can also process the reviews or recommendations and present a result thereof to the shopper before the shopper makes an online purchasing decision.

Dialog systems in the form of messaging platforms have become a prevalent way to conduct electronic conversations in recent years. For purposes of explanation, messaging platforms are understood to include an interaction between messaging services, which typically takes form in software executing on a server, and messaging apps (i.e., "social messaging apps" or "chat apps"), which typically take form in software executing on user devices. Messaging platforms enable messaging channels, which in turn enable electronic conversations between participants via their user devices. Many messaging services started around social networking platforms, but many have now developed into broad services that enable status updates, chatbots, etc. A chatbot is a computer program that can interact with users using textual or graphical/template conversations. Some messaging services offer application programming interfaces that allow for integration of custom made chatbots. As will be more fully described below, the decision-support system includes a chatbot based decision-support system, it being understood the present should not be limited thereto. The chatbot can mediate messaging between itself and shoppers via their user devices. The chatbot can also mediate messaging between itself and reviewers via their user devices.

Figure 1:
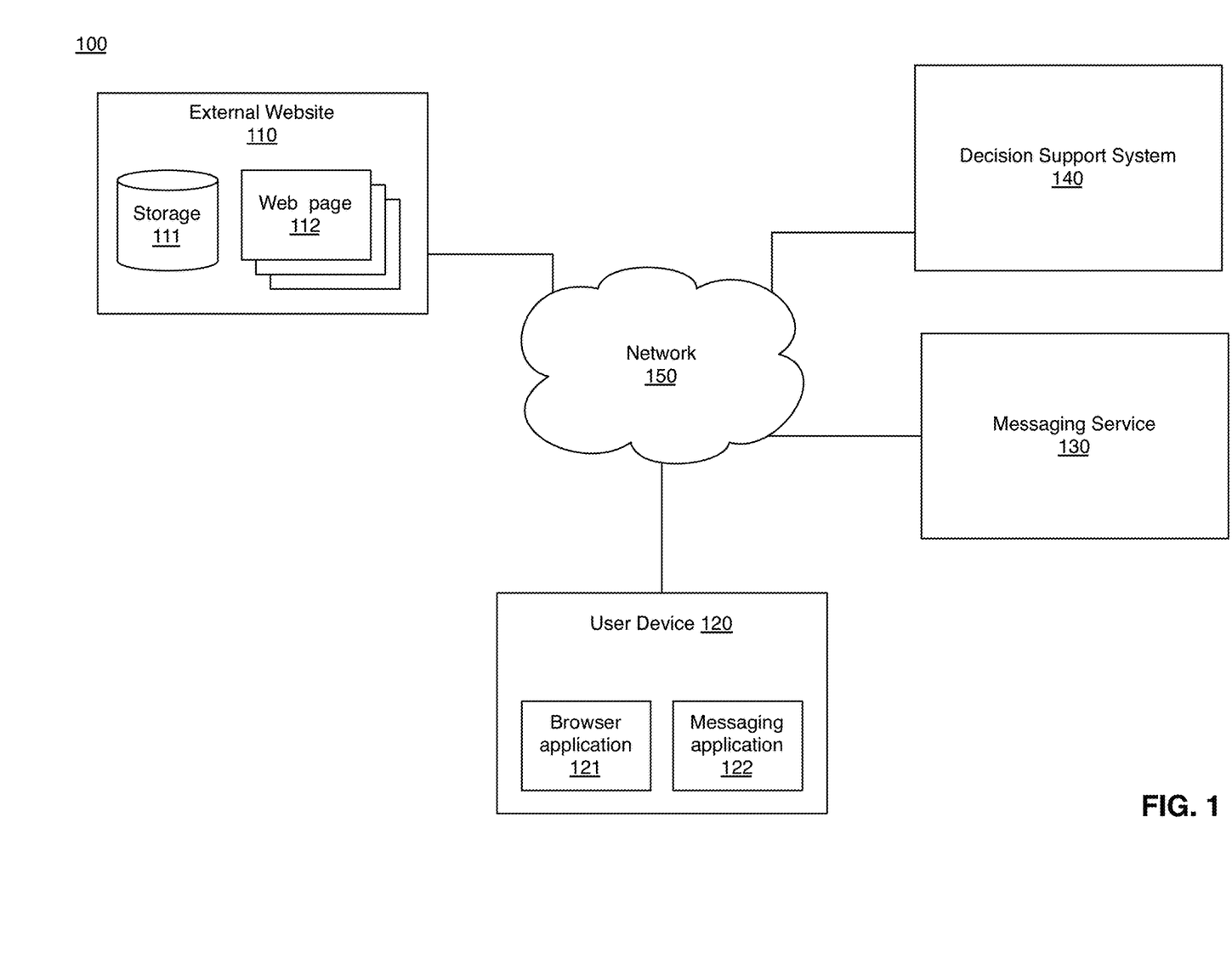
FIG. 1 is a block diagram of a system employing one embodiment the present disclosure.

FIG. 1 is an example system 100 employing one embodiment of the present disclosure. System 100 includes one or more websites 110, user devices 120, a messaging service 130, a decision-support system 140, as well as a network 150 enabling data communication between the various components. A user device can take form in a desktop computer, laptop computer, tablet, smart phone, etc. For purposes of explanation only, user devices are presumed to take form in smartphones, it being understood the term user device should not be limited thereto. User device 120 will be referred to below as a shopper user device 120 or as a primary user device 120. The remaining description will also refer to devices used by reviewers as reviewer user devices or secondary user devices.

Website 110 comprises one or more web servers that include one or more web pages 112, which may be communicated via network 150 to shopper user device 120. Storage 111, which can be a database, a file system or another storage, stores product information for items displayed at web pages 112.

Shopper user device 120 can access and display web pages 112 using browser application 121. Shopper device 120 includes a messaging application 122 that can be used to communicate with a chatbot (not shown in FIG. 1) of decision-support system 140 via messaging service 130. The aforementioned chatbot can be registered with the messaging service 130.

A shopper's access of website 110 and a shopper's use of messaging service 130 are separate activities that can be linked by the decision-support system 140. More particularly decision-support system 140 connects or links these activities in a manner that enables an online, group decision-support process. Decision-support system 140 can transfer shopping cart items selected at website 110 to trusted reviewers through conversations via messaging service 130 for the purpose of obtaining reviews or recommendations.

Decision-support system 140 provides many functions. Decision-support system 140 can receive and store shopping cart items from website 110. Decision-support system 140 can facilitate the transfer of shopping cart items to reviewers via messaging service 130. Decision-support system 140 can also mediate conversations between itself and user devices (e.g., shopper and reviewer user devices). For example, decision-support system 140 can mediate a conversation in which reviewers are requested to provide reviews or recommendations via messaging service 130. Further, decision-support system 140 can process reviews provided by reviewers, and send back results of the processing to shoppers and/or reviewers.

Figure 2:
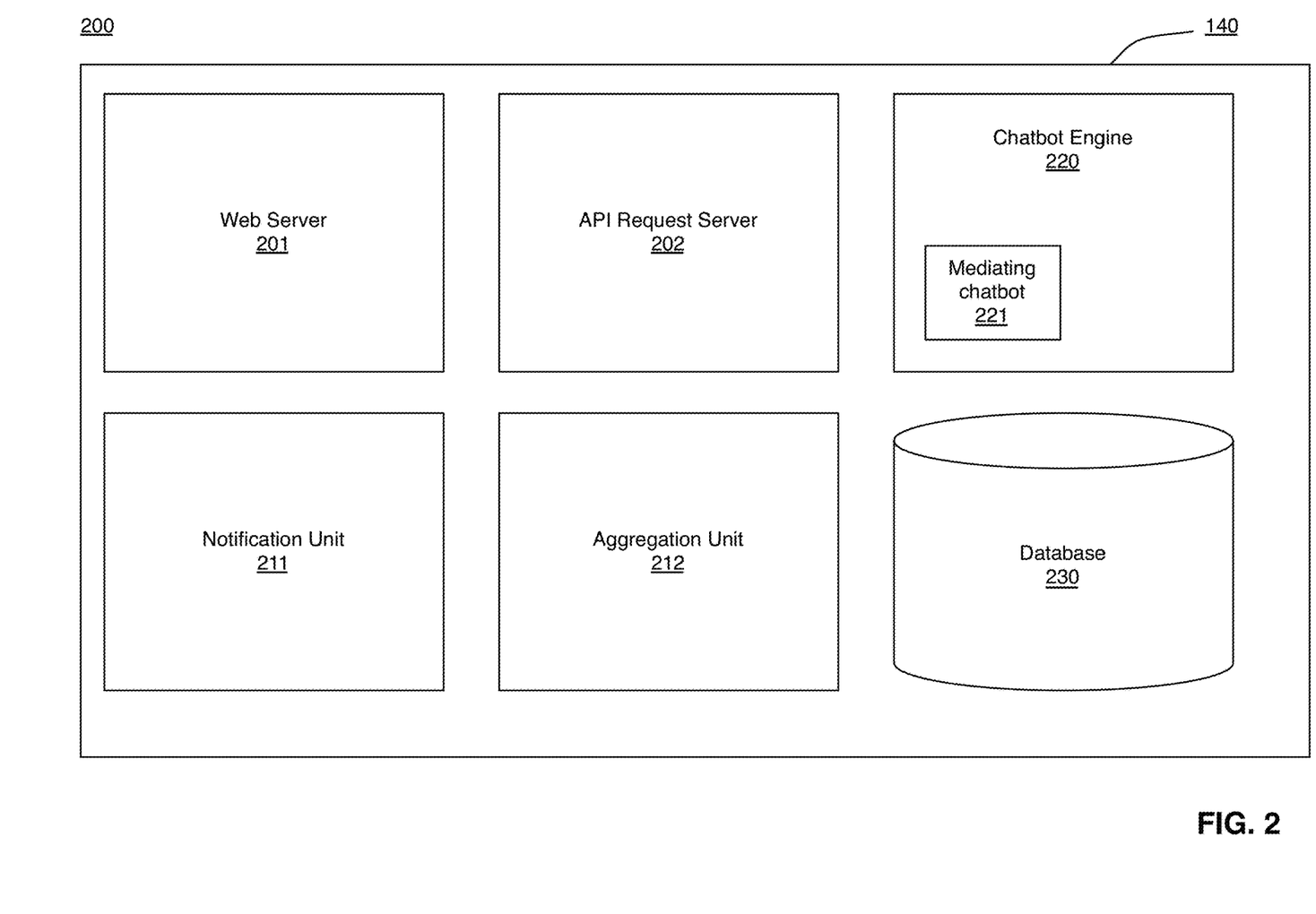
FIG. 2 is a block diagram of a decision-support system according to one embodiment of the present disclosure.

FIG. 2 is a block diagram illustrating one embodiment of a decision-support system 140. This embodiment includes a web server 201, an API request server 202, a chatbot engine 220, which implements one or more mediating chatbots 221, a notification unit 211, an aggregation unit 212, and a database 230.

The web server 201 is used to render web pages and web views, also called widgets, which can be embedded in messaging with user devices. In one embodiment, the web server 201 renders a ranking widget, an example of which is shown with label 840 in FIG. 8.

The API request server 202 implements a representational state transfer (REST) interface and provides access to data in JSON format. API request server 202 is used by the web server 201, chatbot engine 220, and to limited extent by user devices 120. It is further used to separate data from form.

A chatbot is a computer program that can conduct conversations with reviewers and shoppers. Chatbot engine 220 is a program that creates chatbots 221. These chatbots are able to conduct conversations based on natural language or based on decision trees, depending on the embodiment and the support of the target messenger service. The natural language based embodiments can be based on pattern matching. Decision tree embodiments can display predefined, menu style buttons at each user interaction step, and ask the user to select one of the predefined answers. Certain embodiments of the disclosure may use a text-to-speech interface, a speaker and a microphone to conduct voice conversations. The present disclosure provides a mechanism that enables shopper or reviewer involvement with a chatbot.

The notification unit 211 can notify users (e.g., shoppers and/or reviewers) when updates in the online decision-support process are made. Notification unit 211 may notify users that other users participated in the online decision-support process or that a final result has been achieved. The aggregation unit 212 processes reviews provided by reviewers and implements a rating or ranking algorithm. The database 230 is used as local storage for decision-support system 140. In one embodiment of the disclosure, it is implemented as a relational database.

Figure 3:
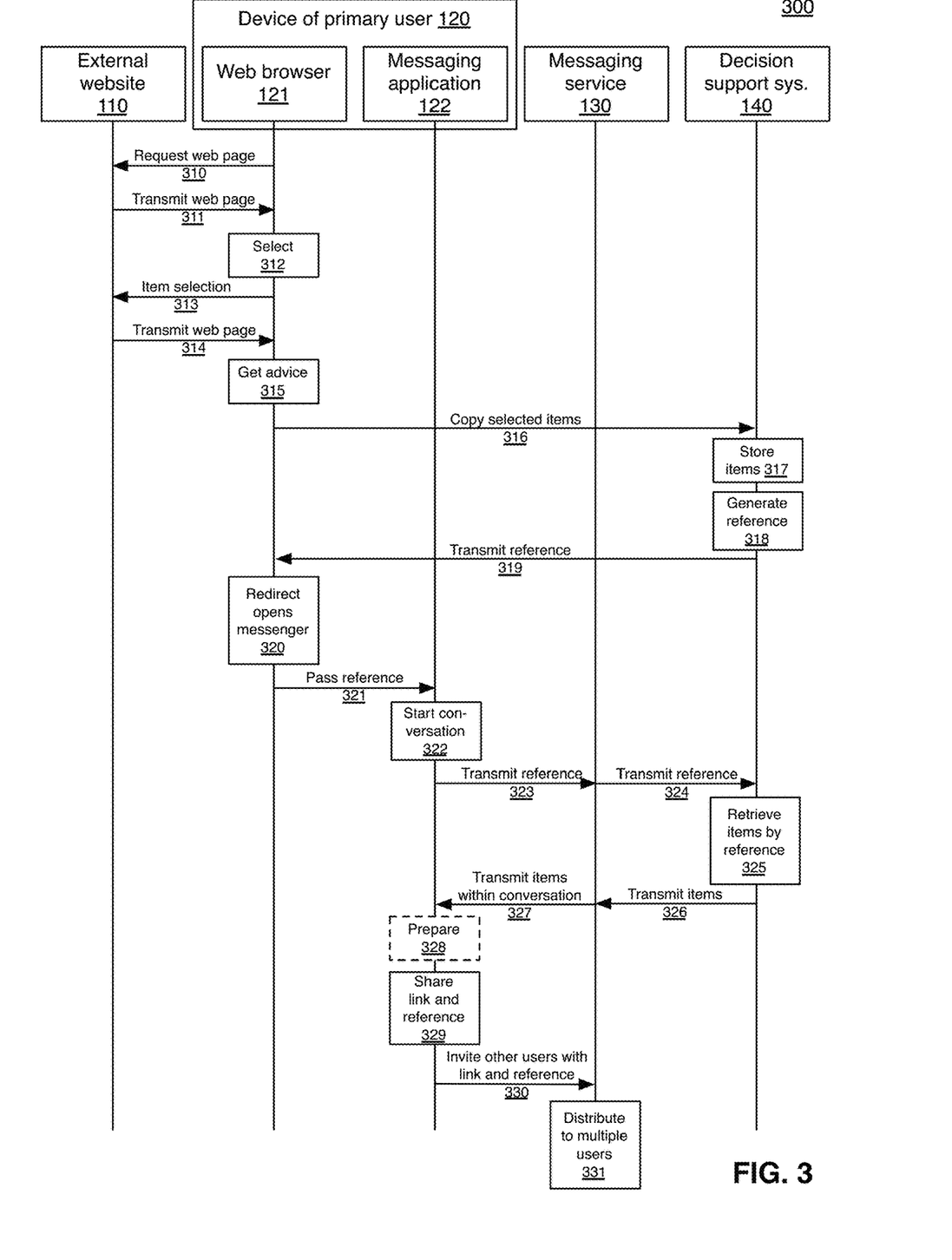
FIG. 3 is an interaction diagram that shows relative aspects of a decision-support process according to one embodiment of the present disclosure.

With continuing reference to FIGS. 1 and 2, FIG. 3 is an interaction diagram of a process 300 according to one embodiment of the present disclosure. The process 300 involves website 110, which includes web pages 112. The website may be an E-commerce website, and web pages 112 may contain items for sale. A primary user (i.e., shopper or customer) may use a web browser 121 of device 120 to access a web page 112 of website 110 in step 310, either by following a hyperlink or by entering the website's URL. In response 311, the website transmits the requested web page 112 using network 150.

Figure 7:
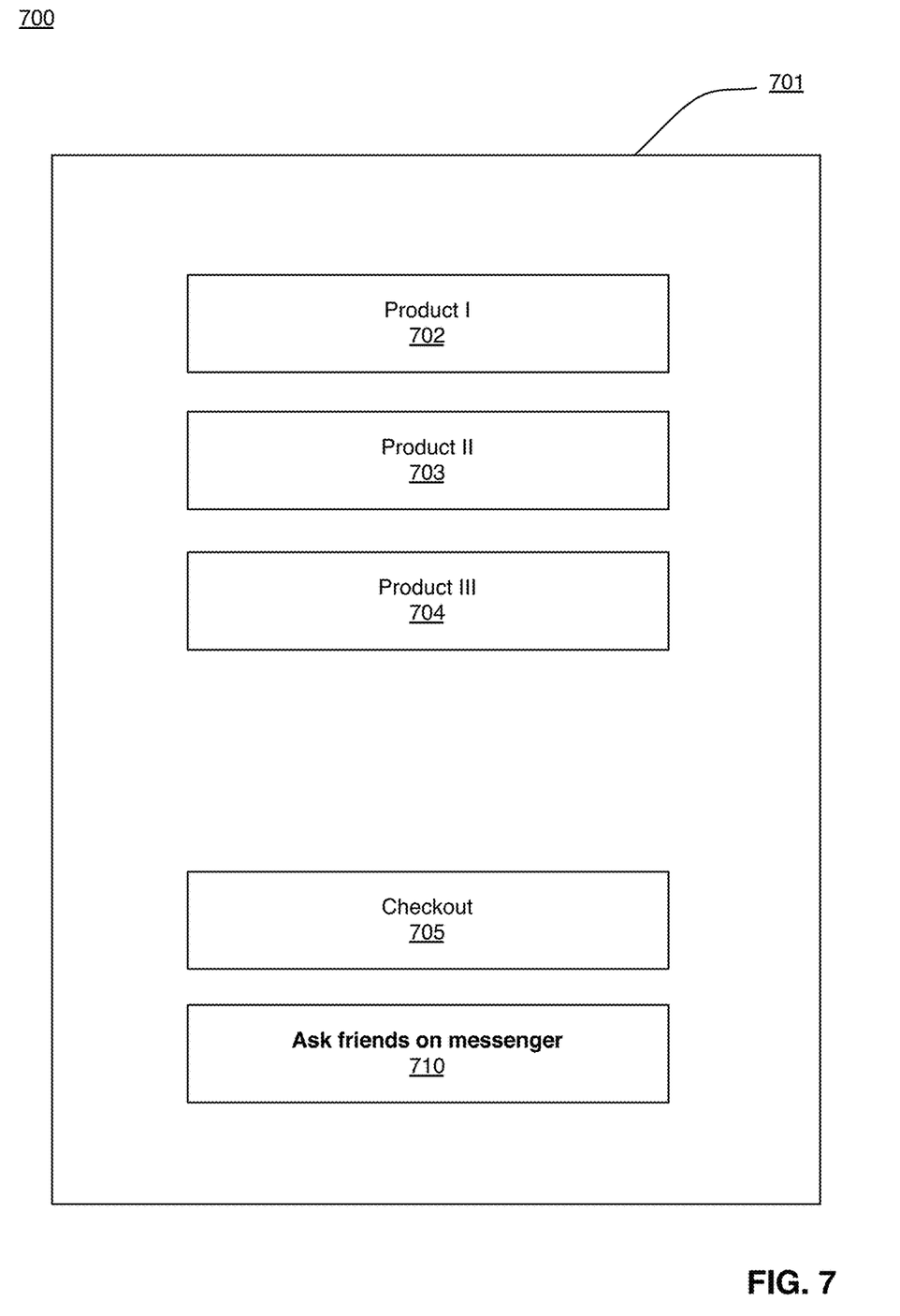
FIG. 7 is a diagram of an example shopping cart of an E-commerce website according to one embodiment of the present disclosure.

The shopper selects one or more items from one or more web pages in step 312. The shopper may use the website's own mechanism for this task. For example, the website can provide a shopping cart into which a shopper can put one or more items. An example shopping cart is 701 is shown in FIG. 7. In other embodiments, shoppers can select items using a website's wish list or a client-side selection mechanism, which is entirely independent of a website 110. For purposes of explanation only, the present disclosure will be described with respect to item selection through an add-to-shopping-cart function provided by website 110. Item selection is communicated in step 313. Eventually, the website will update the web page at 314 and display a virtual shopping cart 701 containing item selection.

The shopper can engage the decision-support system 140 from shopping cart 701. According to one embodiment, web browser 121 shows example shopping cart 701 of FIG. 7, which lists all selected items 702-704 and an additional web button "Ask friends on messenger" 710. The shopper activates this button from browser 121 at step 315, which in turn initiates a transfer operation in which a copy of product information for the shopping cart items 702-704 is transmitted in serialized JSON format to the API request server 202 of the decision-support system 140 in step 316. In an alternative embodiment, a shopper can send product information to decision-support system 140 for an item by scanning a quick response (QR) code or other machine readable code associated with the selected item. In this alternative embodiment, the shopper may scan the code with device 120 or other user device with scanning capabilities. Using this code as a reference, the decision-support system 140 could retrieve related product information from the website 110 or storage 111 for storage in database 230.

At step 317 the decision-support system 140 receives and stores product information for the shopping cart item(s) in database 230, and generates a corresponding shopping cart (SC) reference at 318. Decision-support system 140 sends a redirect instruction to web browser 121 in step 319. This redirect instruction contains the generated SC reference and a hyperlink to a mediating chatbot 221.

Web browser 121 receives the redirect instruction. Messaging application 122 on device 120 is opened at step 320 in response to shopper activation of the redirect instruction.

The SC reference of the redirect instruction is passed to messaging application 122 at step 321. At 322 messaging application 122 initiates a conversation with the endpoint of mediating chatbot 221 through network 150 and messaging service 130. To that end, messaging application 122 passes the SC reference to messaging service 130 at 323, and messaging service 130 in turn transmits the SC reference to chatbot engine 220 at 324.

Chatbot engine 220 uses the SC reference to retrieve the corresponding shopping cart item(s) from database 230 by issuing API calls through the API request server 202 at step 325. The retrieved item(s) are serialized and transmitted in a message to the messaging service 130 at 326. In one embodiment, the retrieved shopping cart item(s) are serialized into JSON format before they are transmitted to messaging service 130, which in turn sends the message to the messaging application of user device 120 in the established conversation at step 327.

Shopper user device 120 receives the message, which includes the shopping cart item(s). The shopper may view and/or augment the shopping cart item(s) in step 328. For example the shopper may: paginate through a number of shopping cart item(s); inspect them in different ways; manage, edit and change them; link additional resources such as web links, images or videos.

After the shopper is satisfied with the shopping cart item(s) and any augmentations (e.g., added links), the shopper can select reviewers with whom the shopper can share the shopping cart item(s) and any augmentations thereof. Messaging application 122 and messaging service 130 can be used to start an electronic conversation with reviewers for the purpose of obtaining their reviews or recommendations on the shopping cart item(s). At step 329 a list of user reviewers can be selected using the messaging application 122. In one embodiment, the shopper can select the reviewers from contacts in memory that is accessible through messaging application 122. When the reviewer list is created, the list, the SC reference and/or any augmentations can be sent to messaging service 130 using an invitation system provided by messaging application 122 and/or messaging service 130 at 330. The list may include contact information (e.g., smartphone telephone numbers, user names, email addresses, etc.) for the selected reviewers. In alternative embodiments, the SC reference and contact information can be sent to messaging service 130 via the invitation system, separately for each reviewer, or to a group of the messaging system that contains many users. For the purposes of explanation only, the present disclosure will presume that a list of reviewers, including their contact information, is sent to messaging service, it being understood the present disclosure should not be limited thereto. Messaging service 130 receives the SC reference and contact information for the list of selected reviewers, and starting at step 331 messaging service 130 can start a process for establishing conversations between the reviewers and chatbot 221 via messaging service 130. With continuing reference to FIGS. 1-3, the decision-support process continues in FIG. 4 when messaging service 130 sends invitations to the selected reviewers (i.e., secondary users) at 410. The invitations are sent to user devices 120a, and can be used to invite the reviewers to start a conversation with the mediating chatbot 221 via messaging service 130. Each invitation, when displayed on the reviewers' devices, may include the SC reference, a textual request (e.g., "Please Help Me") for a review or recommendation on the selected shopping cart item(s), and/or a link to decision-support system 140 via messaging service 130.

Figure 4:
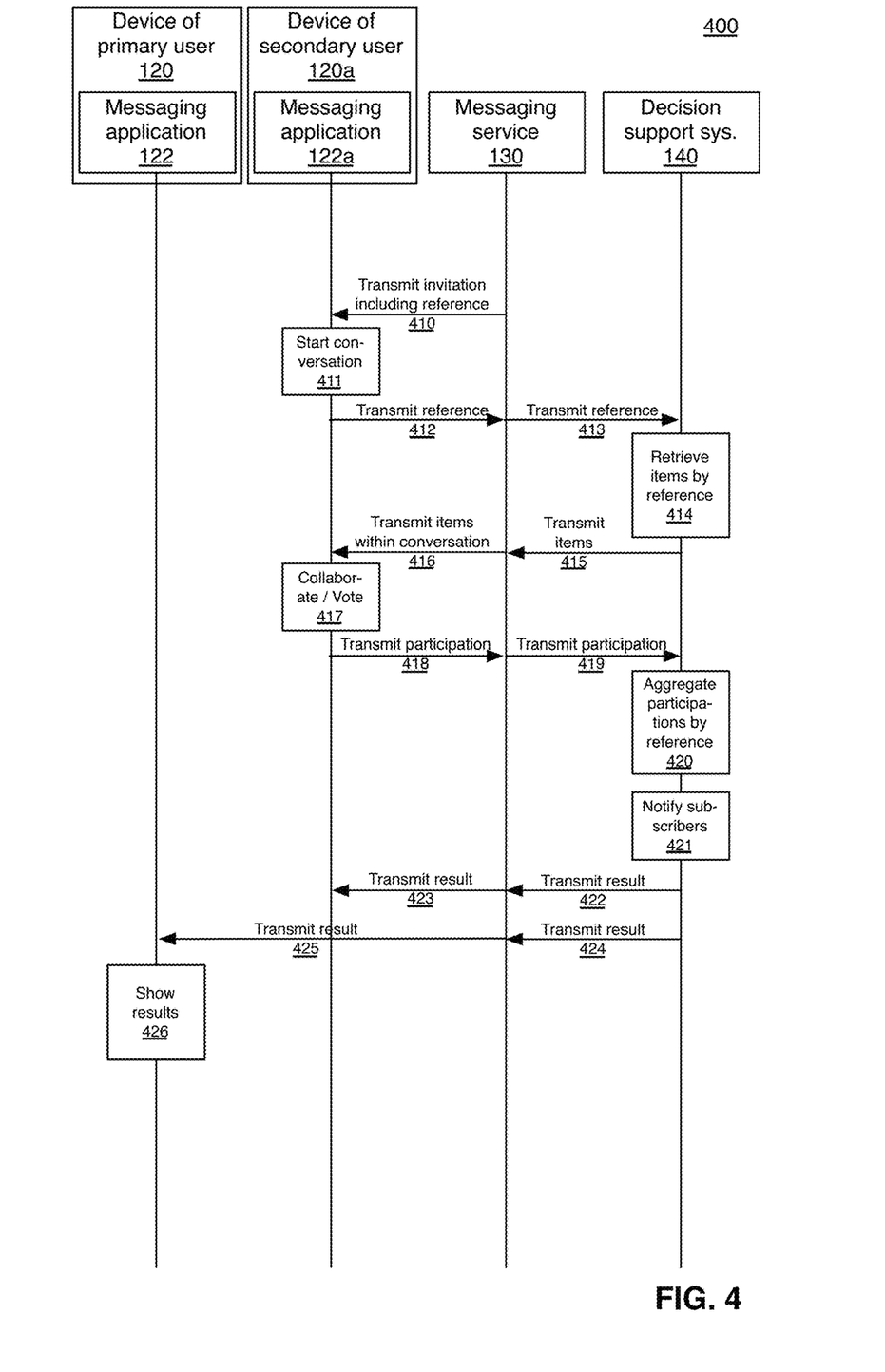
FIG. 4 is an interaction diagram that shows relative aspects of a decision-support process according to one embodiment of the present disclosure.

FIG. 4 is an interaction diagram that describes interactions between decision-support system 140 and reviewers to collect and process their reviews or recommendations. For ease of explanation, FIG. 4 will be described with reference to one secondary user device 120a through which one reviewer may provide a review or recommendation about the example shopping cart item(s). However it is understood that additional secondary user devices engage in the same type of conversation with the decision-support system 140 via messaging service 130 as shown in FIG. 4.

The messenger application 122a opens the endpoint of the mediating chatbot 221 through messaging service 130. In other words, at 411 messenger application 122a starts a conversation with the mediating chatbot 221 through messaging service 130. In certain embodiments, which are illustrated in the process 500 of FIG. 5, there is a separate conversation between each reviewer selected by the shopper and the mediating chatbot (in addition to the conversation between the shopper and the chatbot as described above), and in other embodiments, there is a single group conversation that is shared between all users (e.g., shopper and selected reviewers) and the chatbot. FIG. 6 illustrates an example process 600 of a group conversation.

With continuing reference to FIGS. 1, 2 and 4, messaging application 122a opens a conversation with chatbot 221. To this end user device 120a sends the SC reference of the invitation to decision-support system 140 through messaging service 130 at steps 412 and 413. The SC reference is received by chatbot engine 220, and the chatbot engine uses the SC reference at step 414 to retrieve the corresponding shopping cart item(s) from database 230 by issuing API calls through the API request server 202. The retrieved item(s) are then serialized into, for example, JSON format, and transmitted at step 415 to the messaging service 130, which in turn embeds and transmits them in a message to the messaging application 122a using the established conversation at 416.

Through their user devices, such as secondary user device 120a, reviewers can inspect and collaborate on the shopping cart item(s) at step 417. The collaboration options may include: providing written comments on the shopping cart item(s); adding additional information; providing a numerical rating for one or more of a shopping cart item(s); ranking the shopping cart items in order of preference; etc.

Figure 8:
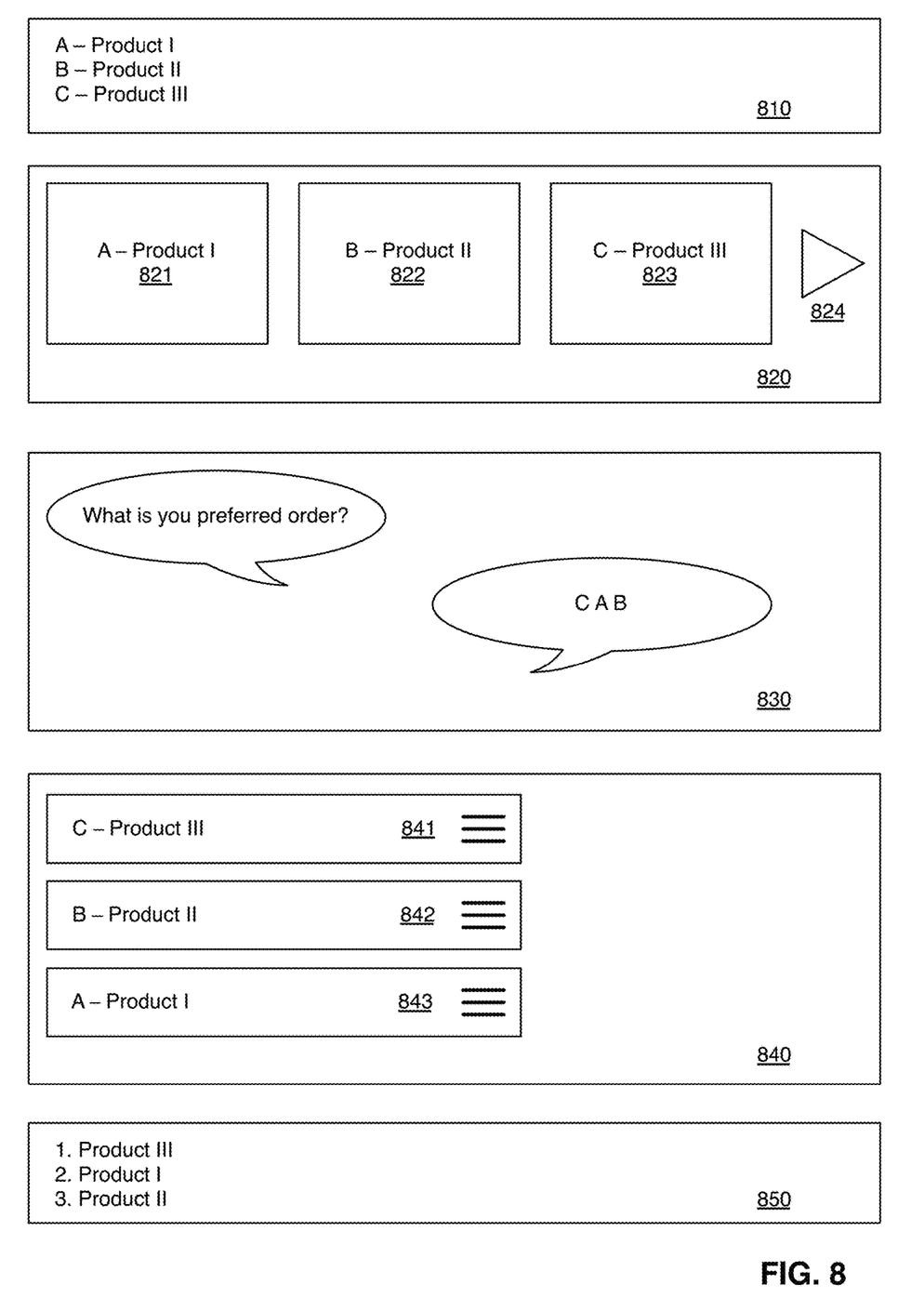
FIG. 8 is a diagram that illustrates various interfaces according to certain embodiments of the present disclosure.

In one embodiment, the reviewer can rank shopping cart items by starting a vote function from the messaging application 122a. The voting function can be started by activating a button on the interface of device 120a. Alternative methods of starting this voting function are contemplated. Once started, the voting function may display the shopping cart items on user device 120a. The shopping cart items can be textually or graphically displayed. With respect to the latter, an image of each of the shopping cart items may displayed. In addition, each shopping cart item may be displayed with corresponding links to additional information. FIG. 8 illustrates various example interfaces that can be used to display the items on user device 120a after starting the vote function. Interface 810 illustrates an example textual listing of shopping cart items identified by product name (e.g., Product I, Product II, and Product III). The shopping cart items are displayed in interface 810 along with reference characters (e.g., A, B or C) assigned to them by decision-support system 140. In interface 820 the example shopping cart items are displayed graphically as images 821-823 in a carousel. Any additional items of the shopping cart can be graphically shown after activating button 824. Like the interface 810, the graphical images 821-823 are displayed with decision-support system assigned reference characters A B, and C, respectively.

There are many different methods in which a reviewer can rank shopping cart items. In one embodiment, the reviewer may rank the shopping cart items using the reference characters provided by decision-support system 140. Interface 830 is an example in which the reviewer ranks the example shopping cart items by decision-support system assigned reference characters in order of preference. In the example shown in interface 830, the reviewer has entered a listing C A B, which indicates Product III is preferred over Product I, which in turn is preferred over product II. The ranking shown in interface 830 may result from using voice to text software executing on device 120a. Another ranking method uses graphical element interface 840, which includes a web view from messaging application 122a. In this embodiment, the web view displays a widget, which is a markup language fragment, bundled with style information and functions. The widget is provided to the messaging application 122a by the web server 201 of the decision-support system 140. Using the widget, the user sorts the displayed shopping cart items 841-843 according to the reviewer's preference using an input device such as a mouse or a touch screen to drag and drop the items into a preferred list order. Like interface 830, interface 840 shows that the reviewer has rearranged shopping items to indicate Product III is preferred over Product I, which in turn is preferred over product II. Example interface 850 illustrates a reviewer entered preference list of shopping coproducts, which lacks the decision-support system assigned reference characters.

Returning to FIG. 4, after the shopping cart items have been ranked, for example, by reordering them by reference character to create a ranking list, the ranking list is transmitted by messaging application 122a to the messaging service 130 at step 418. Messaging service 130 in turn transmits the reviewer's ranking list to the endpoint of the mediating chatbot 221 of the decision-support system 140 at step 419. In an embodiment using the widget, the list may be transmitted directly from the messaging application 122a to the decision-support system 140.

Figure 9:
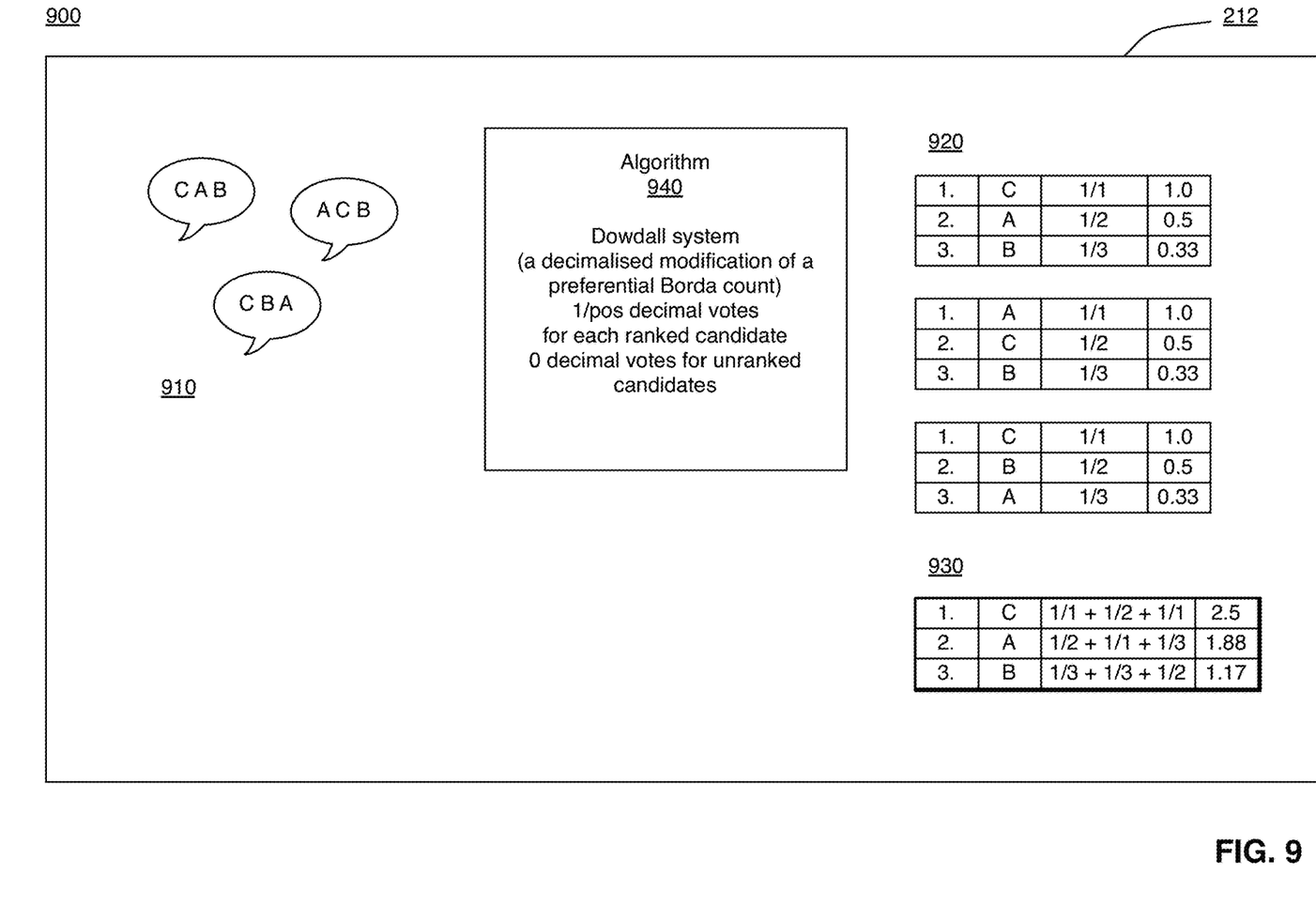
FIG. 9 is a diagram illustrating an example ranking algorithm, which is used to aggregate ranking lists according to one embodiment of the present disclosure.

Decision-support system 140 receives multiple ranking lists of shopping cart item references from user devices 120a via messenger service 130. In response to decision-support system 140 receiving the ranking lists, the API request server 202 can invoke aggregation unit 212 at step 420 for processing the lists of shopping cart item references to generate a result. Example aspects of the aggregation unit 212 are illustrated in FIG. 9. More particularly, FIG. 9 shows that decision-support system 140 receives three sets of ranking lists 910 for the example shopping cart items, which were received from distinct reviewers via their devices 120a. In one embodiment, the rankings can be aggregated using a variant of a preferential Borda count, a so called Dowdall system 940. Each ranked shopping cart item is assigned a reciprocal score of its numerical position in a list, i.e. a score of 1 for the first position or most preferred, a score of 1/2 for the second position, a score of 1/3 for the third position and so on. Tables 920 show the assigned scores for respective rankings 910 as fractions and rounded decimal values. After the scores with the scores been calculated, they are summed up to create result table listing 930. In this example, the results of the processing show that shopping cart item Product III, which is referenced with character C, scored higher than the other two cart items. Thus, Product III is preferred by the reviewers over Product I, which in turn is preferred over Product II.

Returning back to FIG. 4, after aggregation the results in table 930 may be communicated back to reviewers in steps 422 and 423 via respective conversations via messaging service 130. Importantly, the results in table 930 are communicated back to user device 120 via the messaging service 130 at 424, which in turn embeds it into the established conversation and transmits it at 425 to the messaging application 122a. The shopper, who originally launched the decision-support process 300, is informed about the result.

Figure 5:
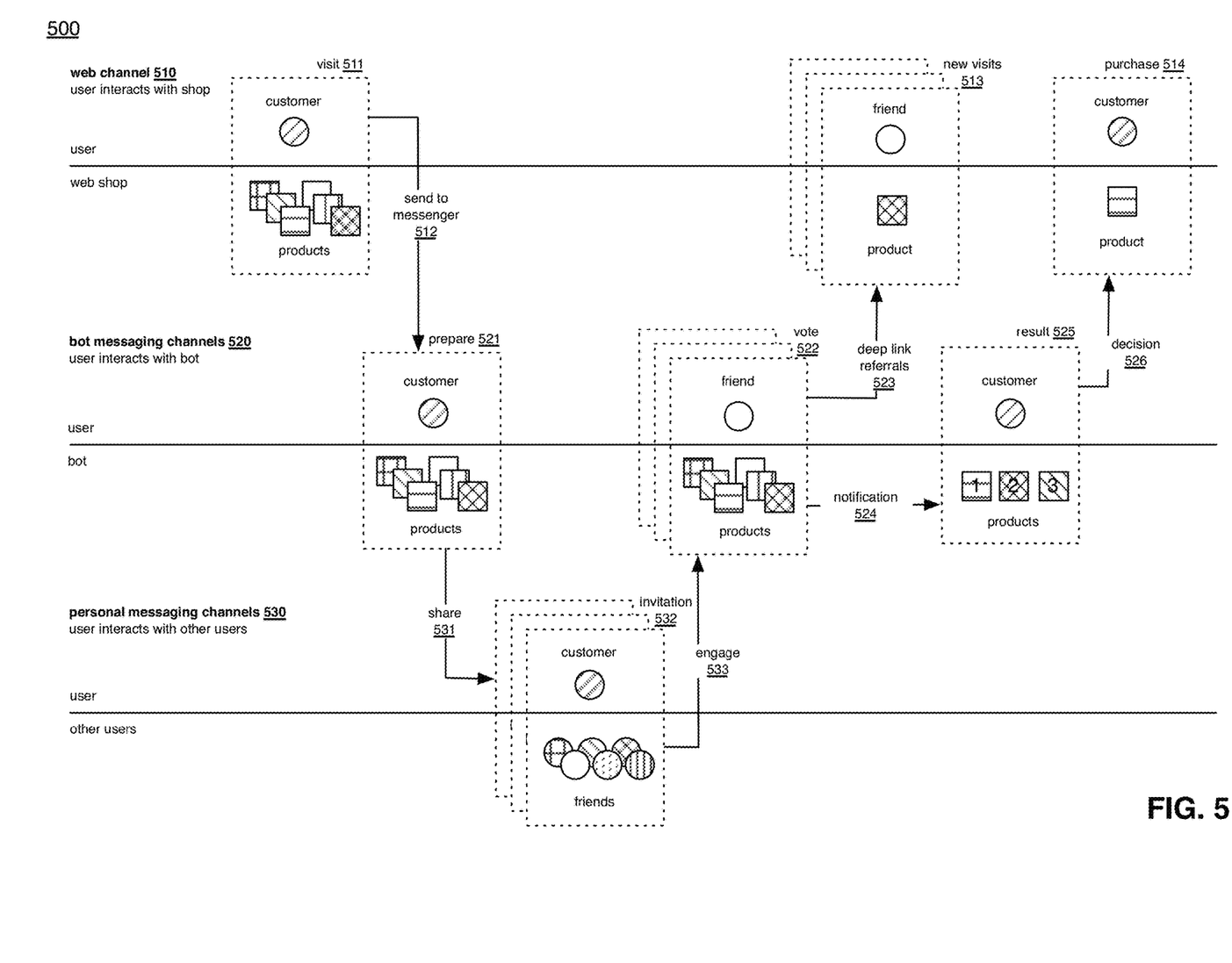
FIG. 5 illustrates an exemplary workflow that shows relative aspects of a decision-support process according to one embodiment of the present disclosure.
Figure 6:
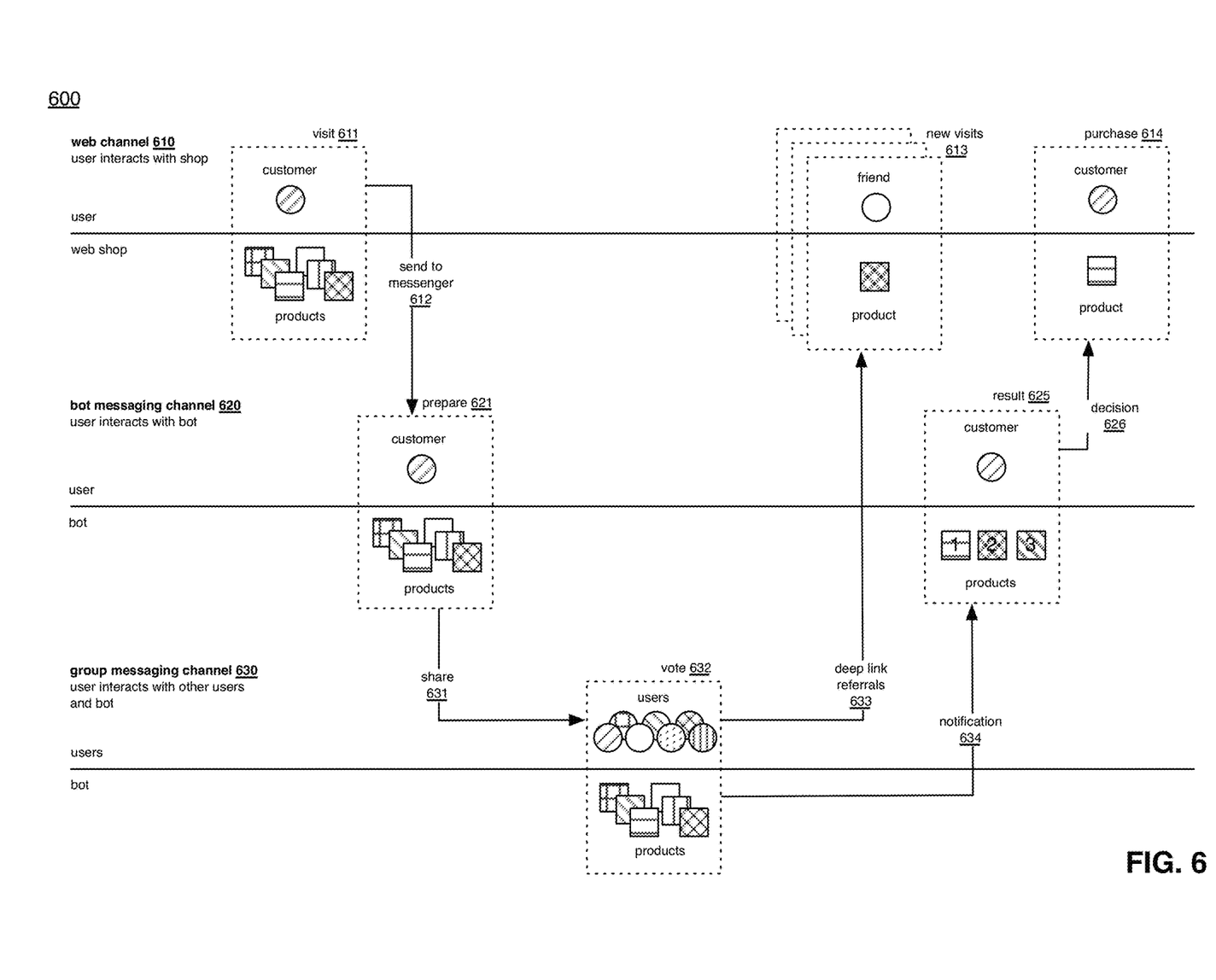
FIG. 6 illustrates another exemplary workflow that shows relative aspects of a decision-support process according to one embodiment of the present disclosure.

FIG. 5 illustrates an exemplary workflow 500 of the decision-support process according to one embodiment. Workflow 500 employs individual messaging conversations with shoppers (i.e. customers) and reviewers (i.e. friends of the customer). FIG. 5 illustrates three different logical communication channels: a web channel 510 in which users interact with websites using web browsers; chatbot messaging channels 520 in which users interact with chatbot 221 using messaging channels established through messaging applications and messaging service 130; personal messaging channels 530 in which users interact with others users using their messaging applications.

With continuing reference to FIGS. 1 and 2, the workflow 500 shown in FIG. 5 starts when a customer (i.e. shopper) accesses website 110 via web channel 510 at 511. E-commerce website 110 is presumed to offer products for sale, and the customer is presumed to have selected one or more products from website 110 using a shopping cart functionality of website 110. The customer wishes to obtain reviews or recommendations from friends (i.e., select reviewers), and at 512 activates, e.g., the example "Ask friends on messenger" button 710 shown on FIG. 7.

In response to activating button 710, messaging application 122 can be opened on customer user device 120, and a chatbot messaging channel 520 can be established through which the customer can converse with chatbot 221. The chatbot 221 provides the product(s) selected by the customer, including product names, images, descriptions, etc., for subsequent display on device 120 as part of the conversation. After the customer optionally adjusts the selected product(s), including their presentation style at 521, the customer can choose to share the selected product(s) with friends via messaging. To this end, the customer selects messaging contacts corresponding to respective friends using a functionality of messaging application 122. An invitation to review the selected product(s) is eventually sent by the customer's messaging application to each of the friends who are identified in the selected messaging contacts at 531. These invitations are sent in respective messaging channels 530 via messaging service 130. Each invitation may include a link or reference to the mediator chatbot 221, and product set or the SC reference mentioned above. When a friend accepts an invitation at 533, a new chatbot messaging channel 520 is opened through which the friend can converse with chatbot 221.

In 522, the chatbot presents the customer-selected product(s) to each of the friends for graphical or textual display on their user devices. For example, the product(s) can be displayed via an interface such as interface 820 of FIG. 8. The chatbot can also request each of the friends to rank the products. Each friend may rank the products into a preferred order list. The list can be either in textual form like that shown in interface 830, or graphical form like that shown in interface 840. Also, each friend may decide to inspect some of the products in step 523 by opening a web channel 510 to website 110, and review information for the products in webpages at 513 and before making a preferred order list. Notification unit 211 provides the customer with notification after a friend has provided their preferred order list to the chatbot at step 524. Ultimately, a result can be calculated by decision-support system 140 based on the preferred order lists from the various friends. The result can be calculated by aggregating all individual lists using the algorithm 940 illustrated in FIG. 9. The result is provided to the customer at 525. The customer may then decide at 526 to purchase the highest ranking product according to the calculated results, and activate a corresponding hyperlink. Consequently, a web channel 510 is opened to the website, and the customer can purchase the desired product at 514.

FIG. 5 illustrates an exemplary workflow in which individual messaging conversations are used in a decision-support process. FIG. 6 illustrates an exemplary workflow for a decision-support process using a group chat according to an embodiment of the disclosure. FIG. 6 is divided into three different logical communication channels: a web channel 610 in which users interact with websites using web browsers; a chatbot messaging channel 620 in which users interact with a chatbot using messaging applications, and; a group messaging channel 630 in which users interact together with a chatbot in a group using messaging applications.

With continuing reference to FIGS. 1 and 2, FIG. 6 shows a customer accessing a website 110. In other words, a customer visits a website using web channel 610. In the embodiment of FIG. 6, the website visited is an E-commerce website offering products. The customer is presumed to have selected one or more products and placed them into a shopping cart provided by the website. At 612 the customer activates, for example, the "Ask friends on messenger" button 710 shown in FIG. 7 to start a decision-support process.

Subsequently, a messaging application 122 opens at the customer's device 120, and a chatbot messaging channel 620 is established through which the customer can converse with mediator chatbot 221. The chatbot welcomes the customer and shows the product(s), including their names, descriptions, images, etc., that the customer had selected at the website in, for example, an interface 820 as part of the conversation. After the customer optionally adjusts the product(s), including their presentation style at 621, the customer can choose to share the product(s) with selected user-friends at 631 for the purpose of obtaining their reviews or recommendations. The customer can send an invitation to the selected user friends. However, in contrast to work for described in FIG. 5, the customer send the invitation using group chat in the process shown in FIG. 6.

The customer-selected product(s) are subsequently forwarded to selected user-friends via group messaging channel 630 when they accept the invitation. Group messaging channel 630 which provides group chat 632 between the customer, the user-friends, and a mediating chatbot of decision-support system 140. Depending on the embodiment of the disclosure, the mediating chatbot might operate according to any one of the following modes: (1) listen to all group messages and reply directly to the group; (2) listen and reply directly to the group only when addressed by name; (3) communicate in a side channel to the group and reply directly to the group; (4) communicate in a side channel and only limited replies to the group.

In step 632, the chatbot presents the customer-selected products to the selected user-friends in a textual interface like interface 820 shown in FIG. 8. The chatbot can also request each of the user-friends to rank the products. In response and respond each of the user-friends may rank the product in a preferred order list. The list can be either in textual form like that shown in interface 830, or graphical form like that shown in interface 840. In one embodiment, the mediator chatbot collects product ranking lists from the user-friends via group chat as the user-friends submit their lists (e.g., lists 910 of FIG. 9) through group messaging channel 630. Before the user-friends submit their ranking lists, any one or more of them may decide to inspect the customer-selected product(s) at website 110 via web channel 610 at 633. When a group member has provided their product ranking list, the customer is notified at 634 thereof. As more user-friends provide their product ranking lists, the customer can browse through them. Decision-support system 140 can process the product ranking lists provided by the user-friends using the method illustrated in FIG. 9, and generate a result at 625. Finally, the result is shown to the customer. Based on the result the customer may decide to purchase the product with the calculated highest ranking at 626 and 614.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   a web server delivering a web page that comprises a hyperlink and identities of one or more products that were selected at an E-commerce website by an online shopper via a web browser executing on a user device of the online shopper;
   in response to activation of the hyperlink by the online shopper via the web browser, transferring product information for the one or more products in a transaction message to a decision-support system via a network;
   in response to the decision-making support system receiving the product information, the decision-making support system sending a redirect command to the web browser, wherein the redirect command, when activated by the online shopper, activates a messaging application, wherein the messaging application, when activated, enables communication between the user device of the online shopper and the decision-support system via a messaging service executing on a server;
   the decision-support system sending some or all of the product information to a plurality of user devices;
   in response to the sending the some or all of the product information, the decision-support system receiving review information related to the one or more products from the plurality of user devices via a messaging service;
   the decision-support system processing the product review information from the plurality of user devices to generate a result;
   the decision-support system sending the result to the user device of the online shopper for display thereon via the messaging service.

2. The method of claim 1 further comprising:
   the decision-support system storing the product information in a data object before the decision-support system sends the some or all of the product information to the plurality of user devices;
   the decision-support system generating a reference;
   the decision-support system mapping the reference to the data object.

3. The method of claim 2 further comprising the decision-support system sending the reference along with the redirect command to the user device of the online shopper.

4. The method of claim 3 further comprising:
the decision-support system receiving second messages from the plurality of user devices, respectively, via the messaging service, wherein each of the second messages comprises the reference;
the decision-support system sending the product information to the plurality of user devices in third messages, respectively, via the messaging service in response to receiving the second messages.

5. The method of claim 3 further comprising the user device of the online shopper sending fourth messages to the plurality of user devices, respectively, via the messaging application and the messaging service, wherein each of the fourth messages comprises the reference.

6. The method of claim 1:
wherein the one or more products comprise two or more products;
wherein each of the review information from the plurality of user devices, comprises a ranking of the two or more products;
wherein the result comprises an aggregation of the rankings.

7. The method of claim 1:
wherein the one or more products includes only one product;
wherein the review information from the plurality of user devices, comprises a rating of the one product;
wherein the result comprises an average of the ratings.

8. The method of claim 1 wherein the decision-support system comprises a chatbot executing on a computer system, wherein the chatbot implements the act of sending some or all of the product information to the plurality of user devices.

9. The method of claim 1 further comprising:
a processor executing instructions stored in memory in response to the activation of the hyperlink, wherein a transaction process is implemented in response to the processor executing the instructions, the transaction process comprising:
accessing a database to read the product information;
generating the transaction message in response to reading the product information.

10. The method of claim 1 further comprising the decision-support system sending the result to the plurality of user devices via the messaging service.

11. A non-transitory memory comprising instructions, wherein one or more processors of a decision-support system implements a method in response to executing the instructions, the method comprising:
receiving a transaction message via a web channel, wherein the transaction message comprises product information displayed in a web page provided by a web server for one or more products selected by an online shopper, wherein the transaction message is received in response to the online shopper activating a hyperlink displayed in the web page;
sending some or all of the product information to a plurality of user devices in respective first messages via a messaging service executing on a messaging server;
in response to the sending the first messages, receiving second messages from the plurality of user devices, respectively, via the messaging service, wherein each of the first messages comprises review information related to the one or more products;
processing the product review information to generate a result;
sending the result to a user device of the online shopper via the messaging service.

12. The non-transitory memory of claim 11 wherein the method further comprises:
storing the product information in a data object;
generating a reference;
mapping the reference to the data object;
sending a third message to the user device of the online shopper before sending the first messages, wherein the third message comprises the reference and a redirect command that, when executed by the user device of the online shopper, opens a messaging application on the user device of the online shopper.

13. The non-transitory memory of claim 12, wherein the method further comprises:
receiving fourth messages from the plurality of user devices, respectively, via the messaging service, wherein each of the fourth messages comprises the reference;
sending the first messages via the messaging service in response to receiving the fourth messages.

14. The non-transitory memory of claim 11:
wherein the one or more products comprise two or more products;
wherein the review information from each of the plurality of user devices, comprises a ranking of the two or more products;
wherein the result comprises an aggregation of the rankings.

15. The non-transitory memory of claim 11:
wherein the one or more products includes only one product;
wherein the review information from each of the plurality of user devices, comprises a rating of the one product;
wherein the result comprises an average of the ratings.

16. The non-transitory memory of claim 11 wherein the instructions comprise a chatbot, wherein the chatbot, when executed, generates and sends the second messages to the plurality of user devices, respectively.

17. A system comprising:
a memory comprising instructions;
one or more processors configured to execute the instructions, wherein a method is implemented in response to executing the instructions, the method comprising:
receiving a transaction message, wherein the transaction message comprises product information for one or more products selected by an online shopper via a web browser, wherein the transaction message is received in response to the online shopper activating a hyperlink in a web page provided by a web server and displayed by a user device of the online shopper;
sending some or all of the product information to a plurality of user devices in first messages, respectively, via a messaging service executing on a messaging server;
in response to the sending the first messages, receiving second messages from the plurality of user devices via the messaging service, wherein each of the second messages comprises review information related to the one or more products; processing the product review information to generate a result;
sending the result to the user device of the online shopper for display thereon via the messaging service.

18. The system of claim 17,
wherein the web server is configured to deliver the web page that comprises the hyperlink and identities of the one or more products that were selected by the online shopper;
a database comprising the product information;
a server configured to access the database to read the product information in response to activation of the hyperlink by the online shopper via the browser.

19. The system of claim 18 wherein the method further comprises:
storing the product information in a data object before the first messages are sent to the plurality of user devices;
generating a reference;
mapping the reference to the data object.

20. The system of claim 19 wherein the method further comprises sending a third message to the user device of the online shopper, wherein the first message comprises the reference and a redirect command that, when executed by the user device of the online shopper, opens a messaging application on the user device of the online shopper.

* * * * *